United States Patent
Wolf et al.

(10) Patent No.: US 10,259,340 B1
(45) Date of Patent: Apr. 16, 2019

(54) INVERTER CONTROL USING RANDOMIZED PULSE WIDTH MODULATION

(71) Applicant: Ford Global Technologies, LLC, Dearborn, MI (US)

(72) Inventors: Christopher Wolf, Ann Arbor, MI (US); Michael W. Degner, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/890,909

(22) Filed: Feb. 7, 2018

(51) Int. Cl.
| | |
|---|---|
| *B60L 15/00* | (2006.01) |
| *H02P 27/08* | (2006.01) |
| *H02P 27/04* | (2016.01) |
| *B60L 15/08* | (2006.01) |

(52) U.S. Cl.
CPC ............ *B60L 15/08* (2013.01); *B60L 15/007* (2013.01); *H02P 27/085* (2013.01); *B60L 2240/526* (2013.01); *B60L 2240/547* (2013.01)

(58) Field of Classification Search
CPC ...... H02P 1/00; H02P 1/04; H02P 1/26; H02P 1/46; H02P 2007/6217; H02P 2005/4003; H02P 3/14; H02P 3/18; H02P 4/00; H02P 6/00; H02P 23/00; H02P 27/00; H02P 27/04; H02P 27/06; H02P 5/00; H02P 6/04; H02P 21/00; H02P 23/004; H02P 23/0095; H02P 25/083
USPC .......... 318/400.01, 700, 701, 727, 779, 799, 318/800, 801
See application file for complete search history.

(56) References Cited

U.S. PATENT DOCUMENTS

| | | | |
|---|---|---|---|
| 6,002,226 A | 12/1999 | Collier-Hallman et al. | |
| 8,456,115 B2 | 6/2013 | Wu et al. | |
| 9,172,316 B2 * | 10/2015 | Bae | ........... H02P 27/085 |
| 9,479,095 B2 | 10/2016 | Sankaran | |
| 2016/0311426 A1 | 10/2016 | Sato | |

* cited by examiner

*Primary Examiner* — Antony M Paul
(74) *Attorney, Agent, or Firm* — David Kelley; Brooks Kushman PC (57) ABSTRACT

A system for a vehicle including an inverter electrically between a motor and traction battery, and a controller configured to operate the inverter at one of a predefined set of discrete frequencies selected according to rotor-torque-based probability weights corresponding to each of the discrete frequencies such that a probability that the inverter operates at the one changes as rotor torque changes.

15 Claims, 5 Drawing Sheets

INVERTER CONTROL USING RANDOMIZED PULSE WIDTH MODULATION

TECHNICAL FIELD

The present disclosure relates to systems and methods for controlling an inverter in a hybrid or a plug-in hybrid vehicle using randomized pulse width modulation (PWM).

BACKGROUND

Hybrid-electric and other electrified vehicles utilize stored energy for propulsion. A traction battery may include a plurality of electrochemical cells connected to a bussed electrical center (BEC) via positive and negative battery terminals. The battery cells may have any suitable configuration and serve to receive and store electric energy for use in operation of the vehicle. Energy may be received from an electrical grid during a charging event, e.g., at a charging station connected to a power grid. An on-board motor may also generate energy during regenerative braking events. Electrified vehicles rely on various electrical systems to manage and distribute power to the various components. Electrified vehicles often utilize contactors and switches to manage the power flow between high-voltage electrical devices.

SUMMARY

A system for a vehicle including an inverter electrically between a motor and traction battery, and a controller configured to operate the inverter at one of a predefined set of discrete frequencies selected according to rotor-torque-based probability weights corresponding to each of the discrete frequencies such that a probability that the inverter operates at the one changes as rotor torque changes.

A method for a vehicle includes operating, by a controller, switches of an inverter electrically connected between a motor and a traction battery at one of a predefined set of discrete switching frequencies that is selected according to rotor-speed-based probability weights corresponding to each of the discrete switching frequencies such that a probability that the switches operate at the one changes as rotor speed changes.

A system for a vehicle including an inverter, including a plurality of switches, electrically connected between a motor and a traction battery, and a controller configured to operate the switches at one of a predefined set of discrete switching frequencies selected according to traction-battery-voltage-based probability weights corresponding to each of the discrete switching frequencies such that a probability that the switches operate at the one changes as a voltage of the traction battery changes.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Optimizing vehicle performance may include controlling with respect to one another factors affecting vehicle fuel economy and factors affecting vehicle noise, vibration, and harshness (NVH) phenomena. In one example, a hybrid-electric vehicle may include an inverter controller configured to balance fuel economy considerations and vehicle NVH performance throughout various operating modes of the vehicle. The inverter controller may be further configured to maintain a predefined threshold of control accuracy and maintain system stability.

The inverter controller may be configured to vary the distribution of switching frequencies as a function of operating points of the vehicle. As one example, the inverter controller may be configured to randomly select a switching frequency among a plurality of predefined frequencies. As another example, the inverter controller may select a switching frequency such that a probability mass function, e.g., a probability of choosing a given frequency from the plurality of frequencies, is varied as a function of one or more vehicle operating points, such as, but not limited to, speed, torque, direct current (DC) bus voltage, temperature of the electric motor, and one or more other parameters associated with operating the electric drive system.

Figure 1:
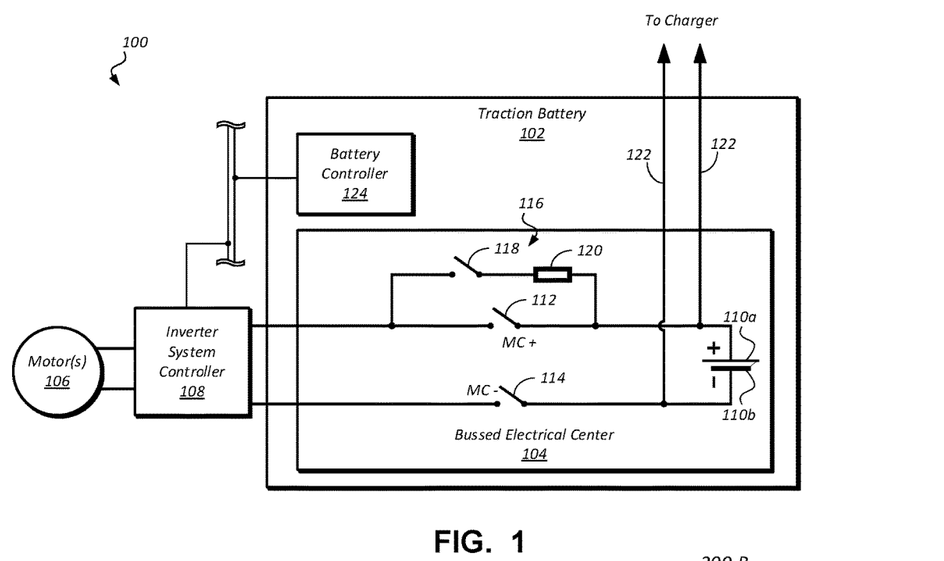
FIG. 1 is a block diagram illustrating propulsion and energy storage components of an electrified vehicle.

FIG. 1 illustrates an example electrified vehicle (hereinafter, vehicle) 100 equipped to transfer energy between an electric machine 106 and a traction battery 102. In some instances, the traction battery 102 configured to receive electric charge via a charging session, e.g., at a charging station connected to a power grid. A plurality of electrochemical cells (not illustrated) of the traction battery 102 may be connected to a bussed electrical center (BEC) 104 via positive and negative terminals 110. The battery cells may have any suitable configuration and serve to receive and store electric energy for use in operation of the vehicle 100. As one example, each cell may provide a same or different nominal level of voltage. As another example, the battery cells may be arranged into one or more arrays, sections, or modules further connected in series or in parallel. While the traction battery 102 is described to include, for example, electrochemical battery cells, other types of energy storage device implementations, such as capacitors, are also contemplated.

The vehicle 100 may further comprise one or more electric machines 106 mechanically connected to a hybrid transmission that is in turn mechanically connected to one or more of an engine and a drive shaft propelling wheels. The electric machines 106 may be configured to operate as a motor or a generator. In some instances, the electric machines 106 can provide propulsion and deceleration capability when the engine is turned on or off using energy stored in the traction battery 102. In other examples, the electric machines 106 also act as generators and can provide fuel economy benefits by recovering energy that would normally be lost as heat in the friction braking system. The electric machines 106 may also provide reduced pollutant emissions since the vehicle 100 may be operated in electric mode under certain conditions.

The traction battery 102 typically provides a high-voltage direct current (DC) output. The traction battery 102 may be electrically connected to an inverter system controller (ISC) 108. The ISC 108 is electrically connected to the electric machines 106 and provides the ability to bi-directionally transfer energy between the traction battery 102 and the electric machines 106. In a motor mode, the ISC 108 may convert the DC output provided by the traction battery 102 to a three-phase alternating current (AC) as may be required for proper functionality of the electric machines 106. In a regenerative mode, the ISC 108 may convert the three-phase AC output from the electric machines 106 acting as generators to the DC input required by the traction battery 102. While the vehicle 100 of FIG. 1 is described as a plug-in hybrid electric vehicle, the description herein is equally applicable to a pure electric vehicle. For a pure electric vehicle, e.g., battery electric vehicle (BEV), the hybrid transmission may be a gear box connected to the electric machines 106 and the engine may not be present.

In addition to providing energy for propulsion, the traction battery 102 may provide energy for other vehicle electrical systems. For example, the traction battery 102 may transfer energy to high-voltage loads, such as, but not limited to, an air conditioning (A/C) compressor and electric heater. In another example, the traction battery 102 may provide energy to low-voltage loads, such as, but not limited to, an auxiliary 12-V battery. In such an example, the vehicle 100 may include a DC/DC converter (not illustrated) configured to convert the high-voltage DC output of the traction battery 102 to a low-voltage DC supply that is compatible with the low-voltage loads. The various components discussed may have one or more associated controllers to control and monitor the operation of the components. The controllers may communicate via a serial bus (e.g., Controller Area Network (CAN)) or via discrete conductors.

In one example, closing one or more of the contactors 112, 114, and 118, in some instances, enables power flow to the electric machines 106 and/or the high-voltage loads, such as compressors and electric heaters, via a connection to the conductors that extend between a respective one of the contactor 112, 114, 118 and the ISC 108. In still another example, closing one or more of the contactors 112, 114, and 118 may enable energy transfer to and from the low-voltage loads, such as a 12-V auxiliary battery, via the DC/DC converter connected to electrical conductor lines extending between the ISC 108 and the positive and negative terminals 110a, 110b. In one example, the main contactors 112, 114 in combination with the pre-charge circuit 116 may be used to charge 122 the traction battery 102, such as via a connection to a charging station. In another example, the battery controller 124 may be configured to command the opening and closing of one or more AC and/or DC charging contactors (not illustrated) in response to receiving a signal indicative of a request to initiate charging of the traction battery 102.

Figure 2A:
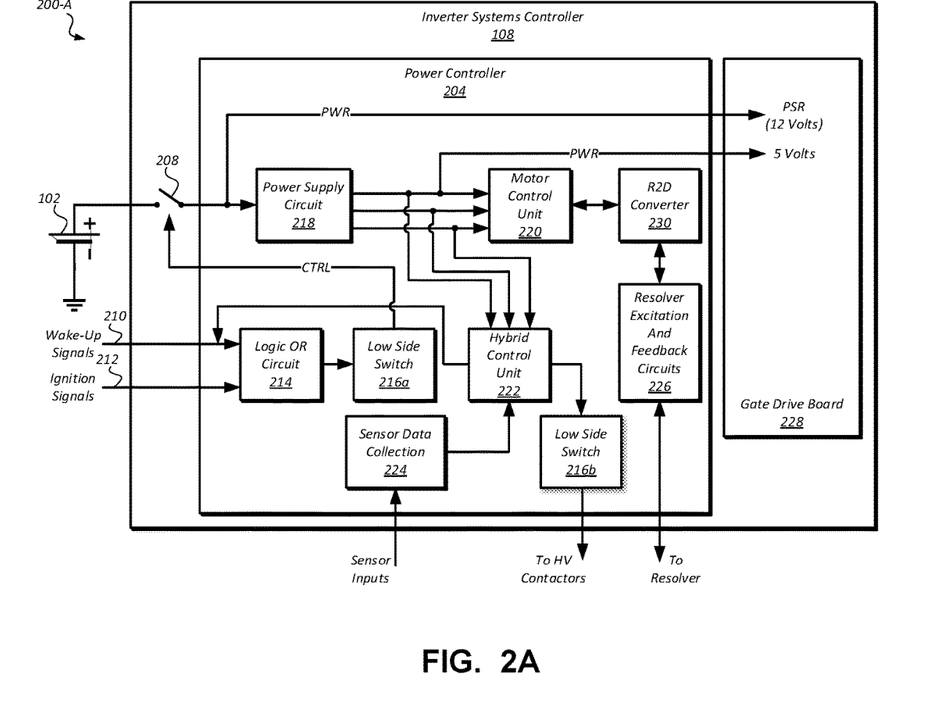
FIG. 2A is a block diagram illustrating a power controller of an inverter.

FIG. 2A illustrates an example power circuit arrangement 200-A for the ISC 108 configured to enable energy transfer to and from the traction battery 102. As one example, a power controller 204 of the ISC 108 may be configured to selectively close a low-voltage switch 208 to provide low-voltage power to a gate drive board (GDB) 228 of the ISC 108, resolver circuits, and so on. In some instances, the low-voltage switch 208 may be connected to a low-voltage battery, e.g., 12-V auxiliary battery of the vehicle 100. The power controller 204 may include a power supply circuit 218 configured to provide at least a portion of energy to power a motor control unit 220 and a hybrid control unit 222.

The motor control unit 220 may control, or provide excitation signals to, one or more resolver sensors configured to determine a position of a rotor shaft (not illustrated) of the electric machine 106. A resolver-to-digital (R2D) converter 90 may be configured to convert output signals of the resolvers to a digital output corresponding to the shaft angle and/or velocity and may provide the generated digital output to the motor control unit 220. The hybrid control unit 222 may receive, e.g., at a sensor data collection unit 224, signals from one or more sensors of the vehicle 100 and may be configured to request low-voltage power flow and may use the power to energize the contactors 112, 114, and 118, thereby enabling transfer of power between the electric machines 106 and the traction battery 102. In some examples, the hybrid control unit 222 may be configured to request low-voltage power flow by "waking up," or causing to become active, other components of the power controller 204.

The GDB 228 may be powered using two independent supply rails, such as a primary side regulator (PSR) supply rail and a 5-V power supply rail, and may be configured to power (drive) one or more components defining the ISC 108. The GDB 228 may define one or more digital logic circuits and microcontrollers configured to generate a switching signal, e.g., an output signal of several milliamperes of current, to turn a transistor on and off. As described, for example, in reference to FIG. 2B, the GDB 228 may be configured to power a plurality of switches 202 that invert DC energy to AC and rectifies AC to DC transferred between the electric machines 106 and the traction battery 102. The GDB 228 may be further configured to power a variable voltage converter (VVC) (not illustrated) that provides bi-directional voltage boost and reduction for energy transferred between the electric machines 106 and the battery cells of the traction battery 102.

The power controller 204 may be configured to power on in response to receiving one of a wake-up signal 210 and an ignition signal 212. The wake-up signal 210 may be a digital waveform having a predefined format or pattern generated by a local signal source (e.g., one or more controllers of the vehicle 100) or by a remote source (e.g., handheld transmitter in communication with the vehicle 100 controller) in response to one or more predefined conditions. As one example, the wake-up signal 210 may comprise a request for a change in operating mode of the ISC 108, e.g., from a sleep mode, or a reduced power consumption mode, to a fully powered mode, and may, for example, be provided via a bus wake-up, a terminal wake-up, and so on. In some instances, as described, for example, in reference to the hybrid control unit 222, the wake-up signal 210 may originate from one or more microcontrollers internal to the power controller 204 in response to receiving one or more sensor signals and determining that a supply of power is necessary to one or more components supplied by the power controller 204.

The ignition signal 212 may be a digital waveform having a predefined format or pattern different from the format or pattern of the wake-up signal 210 and may be generated in response to one or more predefined conditions. In some examples, the ignition signal 212 may be indicative of one or more states (or a change from a given state to another state) of the vehicle 100 ignition switch and may be sent to the power controller 204 by a body controller.

In response to either of the signals 210, 212, the power controller 204 may be configured to cause the low-voltage switch 208 to close to provide power to all components connected thereto, such as, power to close at least one of the positive and negative main contactors 112, 114, power to turn on the GDB 228, the VVC, the inverter, and so on, and power to turn on the R2D converter 230, the resolver excitation and feedback circuits 226 signal converters, signal filters, and other connected components.

The power controller 204 may include a first logic circuit 214 and a pair of low-side switches 216 configured to close the switch 208 to provide a 12-V power supply line to the GDB 228 and to power the power supply circuit 218. In response to receiving at least one of the signals 210, 212, the first logic circuit 214 may be configured to send a signal to a first low-side switch 216a that, in turn, operates to close the switch 208. When closed, the switch 208 may be configured to power both the GDB 228, e.g., via a 12-V power supply rail, and the power supply circuit 218 using low-voltage, e.g., 12 V, power. The power supply circuit 218 may be configured to power the motor and hybrid control units 220, 222 and may be further configured to power the GDB 228 via a low-voltage 5 V power line.

In response to receiving a corresponding signal from the power supply circuit 218, the hybrid control unit 222 may be configured to send control signals to activate the second low-side switch 216b that, in turn, enables power flow to the one or more contactors 112, 114, and 118 of the traction battery 102. The power supply circuit 218, in response to the closing of the switch 208, may be further configured to power the motor control unit 220 configured to generate excitation signals for the resolvers by supplying power to the R2D converter 230 and the resolver excitation and feedback circuits 226.

Figure 2B:
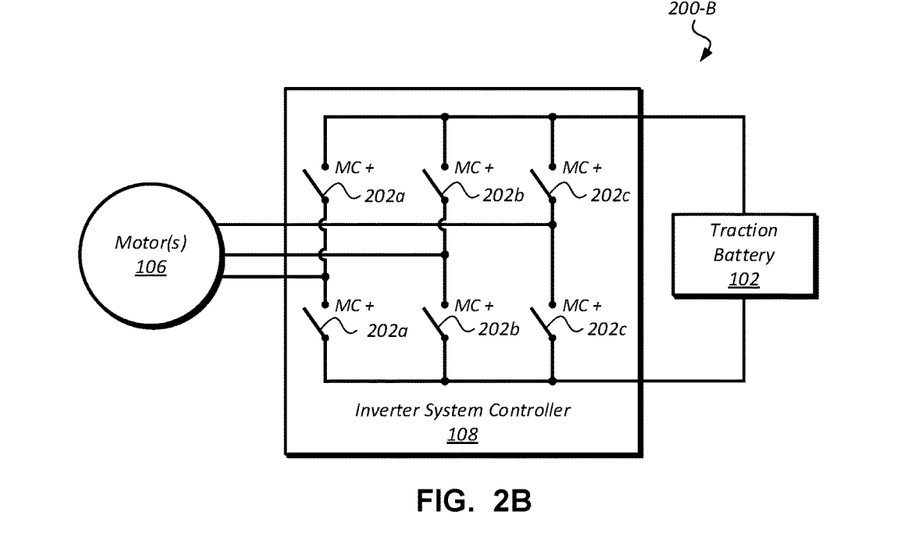
FIG. 2B is a block diagram illustrating an example configuration of inverter switches.

FIG. 2B illustrates an example control switch 202 arrangement 200-B of the ISC 108. In one example, the switches 202 may be disposed on a GDB and may be operated by a power controller, such as the GDB 228 and the power controller 204 described in reference to FIG. 2A.

The electric machines 106 may be three-phase AC machines. The electric machines 106 may have three phase inputs. The power controller 204 may be configured to provide the three-phase voltages/currents to the electric machines 106. The power controller 204 may be configured to selectively couple voltage from a high-voltage DC bus 110 to each of the phase inputs of the electric machines 106. A first pair of switches 202a may be configured to selectively couple a DC bus 110 power and return terminals to a first phase input of the electric machine 106. A second and third pair of switches 202b, 202c may selectively couple corresponding DC bus 110 power and return terminals to the second and third phase inputs of the electric machine 106, respectively.

The switches 202 may include one or more power switching devices. As one example, each of the switches 202 may include one or more of insulated gate bipolar transistors (IGBT), metal-oxide semiconductor field effect transistors (MOSFET), and other solid-state switching devices. Each of the switch 202 may further include a corresponding control input (e.g., gate input) by which the switch 202 may be operated to switch on and off, or closed and open. As described, for example, in reference to FIG. 2A, the control inputs of the switches 202 may be electrically coupled to one or more controllers of the vehicle 100. Accordingly, each of the phase inputs of the electric machine 106 may be selectively coupled to the terminals of the traction battery 102 by a pair of the switches 202. As one example, the switches 202 may be operated such that only one switch 202 of each of the pairs 202a, 202b, and 202c is switched on at a given time.

Each of the switches 202 may include two terminals that control current flow through the switch 202. For example, an IGBT-type switch 202 may include a collector (C) terminal and an emitter (E) terminal and a MOSFET-type switch 202 may include a drain terminal (D) and a source (S) terminal. The control inputs of each of the switches 202 may, for instance, be one of a gate terminal (G) and a Kelvin source/emitter (K) terminal defining a gate loop to control the switch 202.

The switches 202 may be configured to transfer a predefined current value and may have an associated power rating sufficient to operate the electric machine 106 to meet corresponding power and torque requests. In one example, randomized switching frequency pulse width modulation (PWM) is utilized to lower switching induced acoustic noise, which improves vehicle NVH. The switching frequency behavior also has a large impact on the fuel economy (FE) of the vehicle. The relationship between switching frequency and FE is dependent on various states of the electric drive system such as speed, torque, DC bus voltage, and motor temperature. Due to the impact of switching frequency on both NVH and FE, there is a tradeoff between NVH and FE when calibrating the PWM scheme. Existing technologies may not ensure optimality across the entire range of potential vehicle operating points.

Figure 3A:
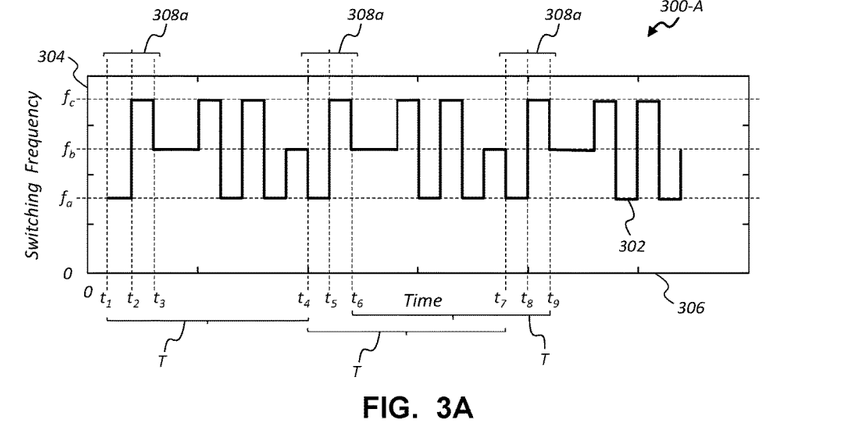
FIG. 3A is a graph illustrating a switching frequency selection based on a fixed sequence.

FIG. 3A illustrates an example graph 300-A of an ordered frequency selection pattern 302 for operating the switches 202. The pattern 302 may include selecting a frequency 304 from a predefined set of discrete frequencies, e.g., the set of frequencies $f_a$, $f_b$, and $f_c$. In one example, the inverter controller 108 may be configured to select one or more frequencies 304 over a period of time 306 according to a predefined order 308. For instance, the inverter controller 108 may select a frequency $f_a$ at a time $t_1$, a frequency $f_c$ at a time $t_2$, and a frequency $f_b$ at a time $t_3$, wherein the times $t_1$, $t_2$, and $t_3$ are consecutive time instances of a switching frequency 304 change. The inverter controller 108 may thereby define the selection order sequence 308a. In some examples, the order sequence 308a may include more or fewer frequencies f, as well as, frequencies f of different values, being selected in a different order and/or at different times t.

In another example, the inverter controller 108 may select frequencies $f_a$, $f_c$, and $f_b$ in a same order 308a at times $t_4$, $t_5$, and $t_6$ consecutive to one another, respectively, and again at times $t_7$, $t_8$, and $t_9$ consecutive to one another, respectively. Stated another way, the pattern 302 may be indicative of selecting the frequencies f one after another in a predefined order. In some examples, the pattern 302 may be indicative of a cyclical (or periodic) repeating selection pattern, such that a period of time T between the times $t_1$ and $t_4$ may be approximately equal to a period of time T between the times $t_4$ and $t_7$ and a period of time T between the times $t_2$ and $t_5$ may be approximately equal to a period of time T between the times $t_5$ and $t_8$, and so on.

In some instances, the probability distribution P for each of the frequencies $f_a$, $f_b$, and $f_c$ may be such that, at each of the times $t_1$, $t_4$, and $t_7$, a probability p of the frequency $f_a$ may be approaching one (1), or $p(f_a)=1$, and corresponding probabilities p of each of the frequencies $f_b$ and $f_c$ may be approaching zero (0), or $p(f_b)=p(f_c)=0$. In some other instances, the probabilities p, at each of the times $t_2$, $t_5$, and $t_8$ may be such that a probability p of the frequency $f_c$ may be approaching one (1), or $p(f_c)=1$, and corresponding probabilities p of each of the frequencies $f_a$ and $f_b$ may be approaching zero (0), or $p(f_a)=p(f_b)=0$. In still other instances, the probabilities p, at each of the times $t_3$, $t_6$, and $t_9$ may be such that a probability p of the frequency $f_b$ may be approaching one (1), or $p(f_b)=1$, and corresponding probabilities p of each of the frequencies $f_a$ and $f_c$ may be approaching zero (0), or $p(f_a)=p(f_c)=0$. While the pattern 302, as illustrated in FIG. 3A, includes selecting frequencies $f_a$, $f_b$, and $f_c$ at one or more of the times $t_1$-$t_9$, it is also contemplated that the ordered pattern 302 may include selecting a different number of frequencies f as well as, selecting frequencies f of different relative values, in a different order and/or at different times.

Figure 3B:
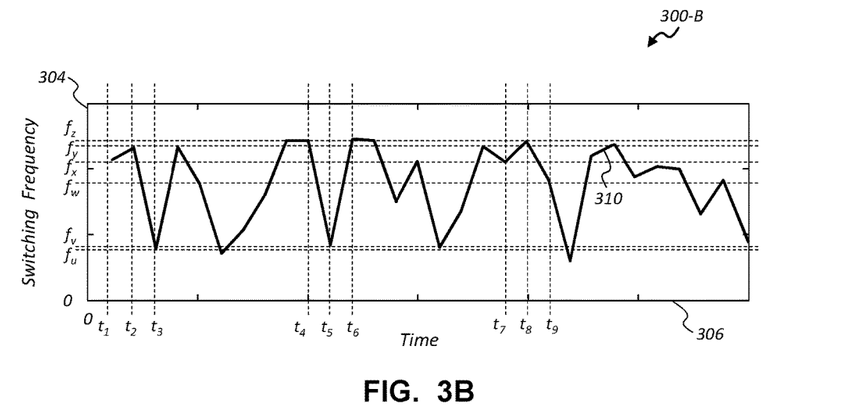
FIG. 3B is a graph illustrating the frequency selection based on a uniform random distribution.

FIG. 3B illustrates an example graph 300-B of a random frequency selection pattern 310 for operating the switches 202. The pattern 310 may include selecting a frequency 304 according to a random probability. In one example, the inverter controller 108 may be configured to randomly select one or more frequencies 304 over a period of time 306. The pattern 310 may result in a uniform probability distribution among the frequencies $f_u$, $f_v$, $f_w$, $f_x$, $f_y$, and $f_z$ in the set. In another example, a probability p of each of the frequencies $f_u$, $f_v$, $f_w$, $f_x$, $f_y$, and $f_z$ in a random selection pattern 310 may be equal to one another, such that:

$$p(f_u) = p(f_v) = p(f_w) = p(f_x) = p(f_y) = p(f_z) = \frac{1}{n}, \quad (1)$$

where n is indicative of a number of frequencies f in a random selection set. While the pattern 310, as illustrated in FIG. 3B, includes selecting frequencies $f_u$, $f_v$, $f_w$, $f_x$, $f_y$, and $f_z$ at one or more of the times $t_1$-$t_9$, it is also contemplated that the ordered pattern 302 may include selecting a different number of frequencies f, as well as, selecting frequencies f of different relative values, in a different order and/or at different times.

Figure 4:
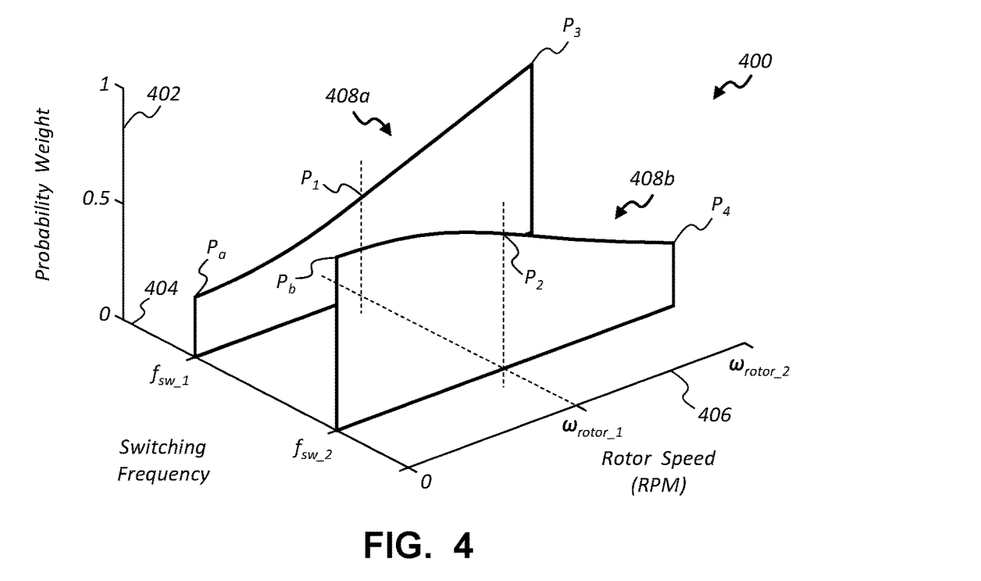
FIG. 4 is a graph illustrating a change in switching frequency with respect to a motor speed.

FIG. 4 illustrates an example weighted selection graph 400 of varying a probability weight 402 of selecting a switching frequency 404 based on a speed 406 of a rotor. The graph 400 includes first and second probability weight profiles 408a and 408b of selecting switching frequencies $f_{sw\_1}$ and $f_{sw\_2}$, respectively. While the frequencies $f_{sw\_1}$ and $f_{sw\_2}$ are illustrated as being selected according to the weight profiles 408a and 408b, respectively, it is also contemplated that the weighted frequency selection may include selecting among more or fewer frequencies, as well as, selecting among frequencies of different relative values, according to same or different weight profiles.

In one example, the inverter controller 108 may be configured to, during a first rotor speed $\omega_{rotor\_1}$, select a first switching frequency $f_{sw\_1}$ according to a first probability weight $P_1$ and select a second switching frequency $f_{sw\_2}$ according to a second probability weight $P_2$, where the first weight $P_1$ is less than the second weight $P_2$, or $P_1<P_2$. As another example, the inverter controller 108 may, during a second rotor speed $\omega_{rotor\_2}$, select the first switching frequency $f_{sw\_1}$ according to a third probability weight $P_3$ and select the second switching frequency $f_{sw\_2}$ according to a fourth probability $P_4$, where the third weight $P_3$ is greater than the fourth weight $P_4$, or $P_3>P_4$. As still another example, responsive to detecting that rotor speed is approaching or equal to zero (0), the inverter controller 108 may be configured to select the first switching frequency $f_{sw\_1}$ according to a probability weight $P_a$ and select the second switching frequency $f_{sw\_2}$ according to a probability $P_b$. The relative values of the pairs of probability weights $P_1$ and $P_2$, $P_3$ and $P_4$, and $P_a$ and $P_b$ may be same or different from those of one another, including, but not limited to, one or more of $P_1 \neq P_2$, $P_3 \neq P_4$, $P_a \neq P_b$, $P_1 \neq P_a$, and so on.

In some examples, corresponding sums of the first and second probability weights $P$ and $P_2$ and that of the third and fourth probability weights $P_3$ and $P_4$ may be equal to one another and/or may be equal to one (1), such that $\Sigma(P_1, P_2)=\Sigma(P_3, P_4)=1$. In some other examples, a sum of probability weights of all switching frequencies for a given rotor speed 406 may be equal to one (1), or $\Sigma(P_n)=1$. In still other examples, the inverter controller 108 may perform weighted selection among the first and second frequencies $f_{sw\_1}$, $f_{sw\_2}$ with the corresponding pairs of probability weights $P_1$, $P_2$ and $P_3$, $P_4$ responsive to detecting that the rotor speed is the first and second rotor speed $\omega_{rotor\_1}$, respectively. In yet another example, the inverter controller 108 may be configured to select among more or fewer frequencies having different probability weights P responsive to detecting the value of the rotor speed.

Figure 5:
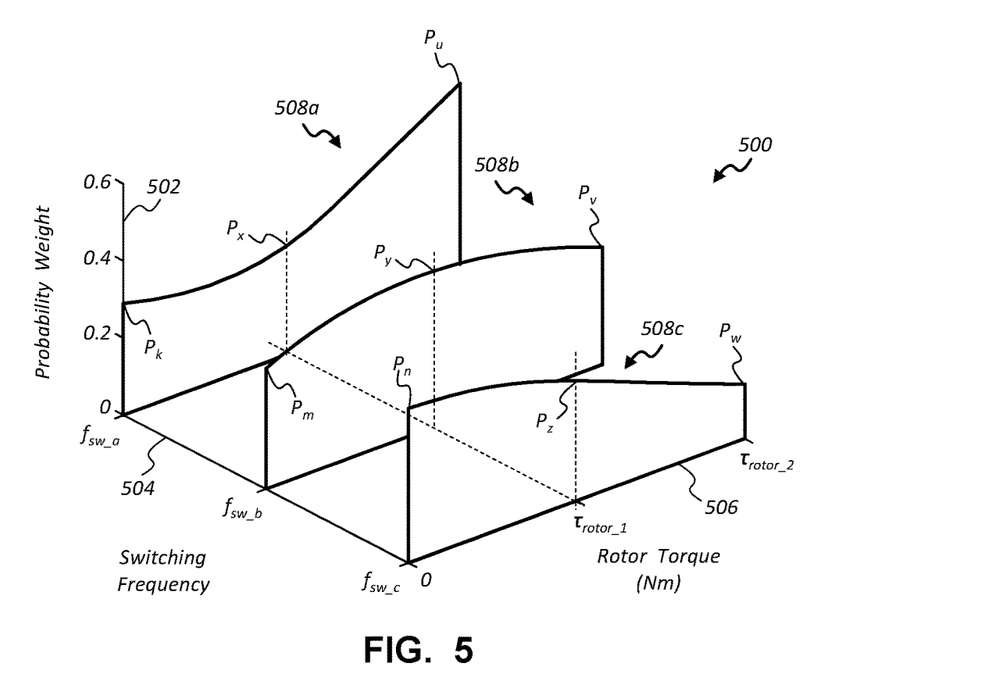
FIG. 5 is a graph illustrating a change in switching frequency with respect to a motor torque.

FIG. 5 illustrates an example weighted selection graph 500 of varying a probability weight 502 of selecting a switching frequency 504 based on a torque 506 of a rotor. The graph 500 includes first, second, and third torque weight profiles 508a, 508b, and 508c of selecting switching frequencies $f_{sw\_a}$, $f_{sw\_b}$, and $f_{sw\_c}$, respectively. While the frequencies $f_{sw\_a}$, $f_{sw\_b}$, and $f_{sw\_c}$ are illustrated as being selected according to the weight profiles 508a, 508b, and 508c respectively, it is also contemplated that the weighted frequency selection may include selecting among more or fewer frequencies, as well as, selecting among frequencies of different relative values, according to same or different weight profiles.

In one example, the inverter controller 108 may be configured to, during a first rotor torque $\tau_{rotor\_1}$, select a switching frequency $f_{sw\_a}$ according to a probability weight $P_x$, select a switching frequency $f_{sw\_b}$ according to a probability weight $P_y$, and select a switching frequency $f_{sw\_c}$ according to a probability weight $P_z$, where the weights $P_x$, $P_y$, and $P_z$ may be $P_x \neq P_y$, $P_x \neq P_z$, and/or $P_x+P_y+P_z=1$. As another example, the inverter controller 108 may, during a second rotor speed $\omega_{rotor\_2}$, select the switching frequency $f_{sw\_a}$ according to a probability weight $P_u$, select the switching frequency $f_{sw\_b}$ according to a probability $P_v$, and select the switching frequency $f_{sw\_c}$, according to a probability weight $P_w$, where the weights $P_u$, $P_v$, and $P_w$ may be $P_u \neq P_v$, $P_u \neq P_w$, and/or $P_u+P_v+P_w=1$. As still another example, responsive to detecting that the rotor torque 506 is approaching or equal to zero (0), the inverter controller 108 may be configured to select the switching frequency $f_{sw\_a}$ according to a probability weight $P_k$, select the switching frequency $f_{sw\_b}$ according to a probability weight $P_m$, and select the switching frequency $f_{sw\_c}$ according to a probability weight $P_n$, where the weights $P_k$, $P_m$, and $P_n$ may be $P_k \neq P_m$, $P_k \neq P_n$, and/or $P_k + P_m + P_n = 1$.

In still other examples, the inverter controller 108 may perform weighted selection among the frequencies $f_{sw\_a}$, $f_{sw\_b}$, and $f_{sw\_c}$ with the corresponding sets of probability weights P responsive to detecting that the rotor torque 506 is a predefined value. In yet another example, the inverter controller 108 may be configured to select among more or fewer frequencies having different probability weights P responsive to detecting the value of the rotor torque 506. In some instances, the inverter controller 108 may be configured to select corresponding probability weights P for each of a set of discrete switching frequencies f for a given the rotor torque or rotor speed value to achieve a predefined fuel economy value and/or a predefined switching noise level, e.g., as indicated by one or more operating parameters of the vehicle 100.

Figure 6:
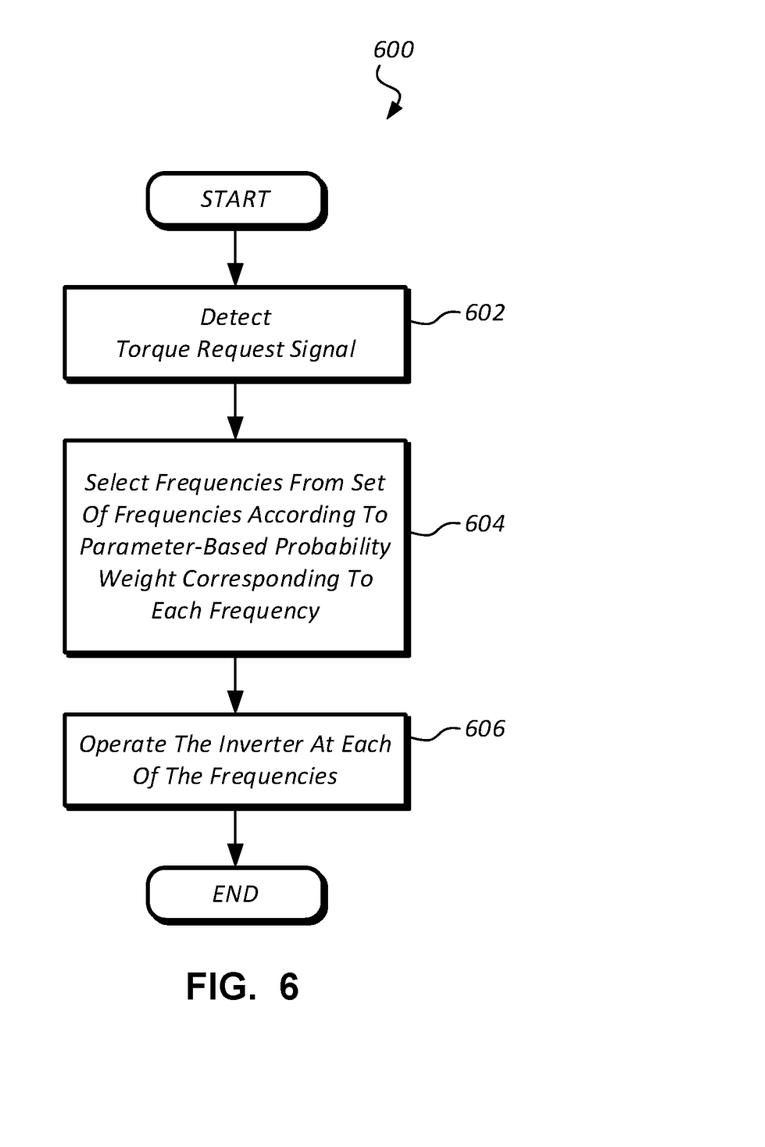
FIG. 6 is a flowchart illustrating an algorithm for varying a selected switching frequency based on vehicle operating point.

FIG. 6 illustrates an example method 600 for operating an inverter according to a weighted selection among a predefined set of discrete switching frequencies. In one example, the inverter controller 108 may be configured to perform one or more operations of the method 600.

The method 600 may begin at operation 602, wherein the inverter controller 108 receives a signal indicative of a change in requested motor torque. The inverter controller 108, at operation 604, selects a probability weight for each frequency from a set of discrete frequencies based on a present value of a vehicle operating parameter. At operation 606, the inverter controller 108 operates the inverter according to the frequencies selected according to the weighted probability selection.

This technology, in some examples, may be based on randomized switching frequency variation. The probability mass function of each of a finite set of potential switching frequencies is varied as a function of vehicle speed and torque, or as a function of other electric drive states such as DC bus voltage or motor temperature. This may allow for optimal fuel economy calibration of the PWM scheme, while preserving the desired NVH characteristics across the entire potential range of potential vehicle operating points.

The proposed scheme may be compatible with any number of potential switching frequencies, and the weight as a function of speed/torque can be calibrated to ensure optimality in both acoustic performance as well as fuel economy. In these examples, the probability mass functions were varied as a function of speed or torque, however they can also be varied as a function of both speed and torque, along with other electric drive states such as DC bus voltage and motor temperature.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A system for a vehicle comprising:
an inverter electrically between a motor and traction battery; and
a controller configured to operate the inverter at one of a predefined set of discrete frequencies selected according to rotor-torque-based probability weights corresponding to each of the discrete frequencies such that a probability that the inverter operates at the one changes as rotor torque changes.

2. The system of claim 1, wherein for a given rotor torque, the rotor-torque-based probability weights are different among the discrete frequencies.

3. The system of claim 1, wherein the rotor-torque-based probability weights are greater than zero.

4. The system of claim 1, wherein the one is further selected according to traction-battery-voltage-based probability weights.

5. The system of claim 1, wherein the one is further selected according to rotor-speed-based probability weights.

6. A method for a vehicle comprising:
operating, by a controller, switches of an inverter electrically connected between a motor and a traction battery at one of a predefined set of discrete switching frequencies that is selected according to rotor-speed-based probability weights corresponding to each of the discrete switching frequencies such that a probability that the switches operate at the one changes as rotor speed changes.

7. The method of claim 6, wherein for a given rotor speed, the rotor-speed-based probability weights are different among the discrete frequencies.

8. The method of claim 6, wherein the rotor-speed-based probability weights are greater than zero.

9. The method of claim 6, wherein the one is further selected according to rotor-torque-based probability weights.

10. The method of claim 6, wherein the one is further selected according to traction-battery-voltage-based weights.

11. A system for a vehicle comprising:
an inverter, including a plurality of switches, electrically connected between a motor and a traction battery; and
a controller configured to operate the switches at one of a predefined set of discrete switching frequencies selected according to traction-battery-voltage-based probability weights corresponding to each of the discrete switching frequencies such that a probability that the switches operate at the one changes as a voltage of the traction battery changes.

12. The system of claim 11, wherein for a given voltage of the traction battery, the traction-battery-voltage-based probability weights are different for each of the discrete switching frequencies.

13. The system of claim 11, wherein the traction-battery-voltage-based probability weights are greater than zero.

14. The system of claim 11, wherein the one is further selected according to rotor-torque-based probability weights.

15. The system of claim 11, wherein the one is further selected according to rotor-speed based probability weights.

* * * * *